March 14, 1967 J. H. LEMELSON 3,309,669

SCANNING APPARATUS FOR READING DOCUMENTS
COMPRISING A ROTATING SCANNING DISC

Filed Jan. 14, 1964 3 Sheets-Sheet 1

INVENTOR.
Jerome H. Lemelson
BY

INVENTOR.
Jerome H. Lemelson
BY

INVENTOR.
JEROME H. LEMELSON
BY 3,309,669
SCANNING APPARATUS FOR READING DOCUMENTS COMPRISING A ROTATING SCANNING DISC

Jerome H. Lemelson, 85 Rector St., Metuchen, N.J. 08840

Filed Jan. 14, 1964, Ser. No. 337,615
17 Claims. (Cl. 340—146.3)

The instant invention relates to document reading devices and more particularly to electronic character scanning devices applicable to scanning alpha-numeric characteristics in a sequential fashion on a line by line basis.

Numerous business and industrial applications require the recording of data in the form of alpha-numeric characters for the purpose of documenting business transactions; meter and instrument readings; inventory accountings, to name just a few. All such data is normally read into a computer or data processing facility for permanent storage, computing or other processing facilities.

Data of this type is normally inserted into the computer or data processing facility by a manual operation such as by punching the data into an IBM type punch card in binary form; generating holes by punching the data into a punched paper tape; or converting data to code by means of a typewriter specially wired as an input device to the computer. All of these operations require visual observation by the operator and manual actuation of the keyboard of the card tape punch or typewriter, all of which are slow and require tedious operations susceptible to the introduction of human error.

The instant invention is adapted to scan alpha-numeric characters printed on a sheet of paper or card, in a sequential fashion and automatically convert the alpha-numeric data into binary form which may be immediately and directly inserted into the computer or data processing facility.

The instant invention is comprised of a platform adapted to receive cards upon which alpha-numeric information is printed. When properly positioned upon the platform, the card actuates a sensing relay such as a microswitch means which is operative to activate a scanning means to scan across a selected line of alpha-numeric data. After each line is scanned a sensing means actuates a feed means which steps the card carrying the data to the next line to be read. This operation is repeated until all of the data on the card is scanned.

The scanning means is comprised of a light source impinging upon the data carrying card. The light is reflected from the card surface and is focused upon a rotating multi-apertured disc means having a plurality of apertures equal in number to the total possible number of alpha-numeric characters to be scanned (say 36 or 26 alphabetic and 10 numeric characters). The light focused upon the rotating disc means is further focused upon light sensing means after passing through the disc apertures. Each aperture has a configuration equivalent to an associated alpha-numeric character.

Radially aligned and associated with the character shaped apertures are radial or circular code apertures arranged in such a manner as to define binary representations of the alpha-numeric character with which it is associated. When a minimum signal is detected by the first light sensing means this activates a plurality of second light sensing means upon which impinges the light passing through the radial or circular apertures. The energized light sensing means generate signals representative of one binary condition representing the character scanned. These signals are impressed in parallel fashion into separate stages of a multistage electronic register. The binary coded character may then be stepped into the computer internal memory in either parallel or serial fashion. The multi-apertured rotating disc rotates one complete revolution so each character in a line is scanned to appropriately scan and convert each alpha-numeric character into binary coded signals. Upon completion of reading the last line of data to be scanned the scanning means is automatically reset to begin scanning the next card inserted. After positioning the card upon the platform, the entire operation is automatic and is performed at speeds not realized by manual data conversion means.

Whereas electro-optical reading apparatus of the prior art operated by scanning each character along a plurality of coordinates or scanning lines to generate plurality of signals each derived when a portion or level of the character is scanned, and which signals are analyzed by comparison means to determine the identity of the character being scanned, the apparatus herein provided scans to determine when minimum light passes through a rotating mask containing apertures the shape of the characters scanned. The occurrence of the condition in which minimum light passes to the photoelectric relay is indicative that the character being scanned corresponds substantially to the shape of the opening in the mask. Upon attaining such condition, the scanning or reading relay is energized to effect the reading of the binary code on the disc associated with the opening in the mask having the shape of the character being read.

It is therefore a primary object of the instant invention to provide a new and improved data conversion means for scanning alpha-numeric characters and automatically converting characters so scanned into binary code groups readily presentable to computers, data processing facilities and the like.

Another object is to provide an electro-optical line character reading apparatus which has a minimum number of components and is therefore substantially simpler and lower in cost to produce than conventional electro-optical readers.

Another object of the instant invention is to provide scanning means for use in computers, data procesors and the like comprising means for sequentially scanning lines of data line-by-line and automatically converting characters so scanned into binary coded representations thereof.

Another object of the instant invention is to provide means for scanning alpha-numeric data comprising means for receiving data carrying card means, automatically stepping said card line-by-line after completion of sequential scanning of each line.

Another object of the instant invention is to provide means for converting alpha-numerically presented data into binary coded representations thereof comprising rotatable scanning means having a plurality of alpha-numeric shaped apertures and associated circular apertures radially aligned for scanning the characters in a card and converting the characters so scanned into binary coded representations thereof.

These and other objects of the instant invention will become apparent when reading the accompanying description and drawings in which:

FIG. 1 is an isometric view of an electro-mechanical scanning device 20 employing the principles of the invention. The scanning apparatus comprises a base 21 which supports means for aligning and driving a document to be read into a reading position, means for scanning the document and means for removing the document once scanned.

Figure 1:
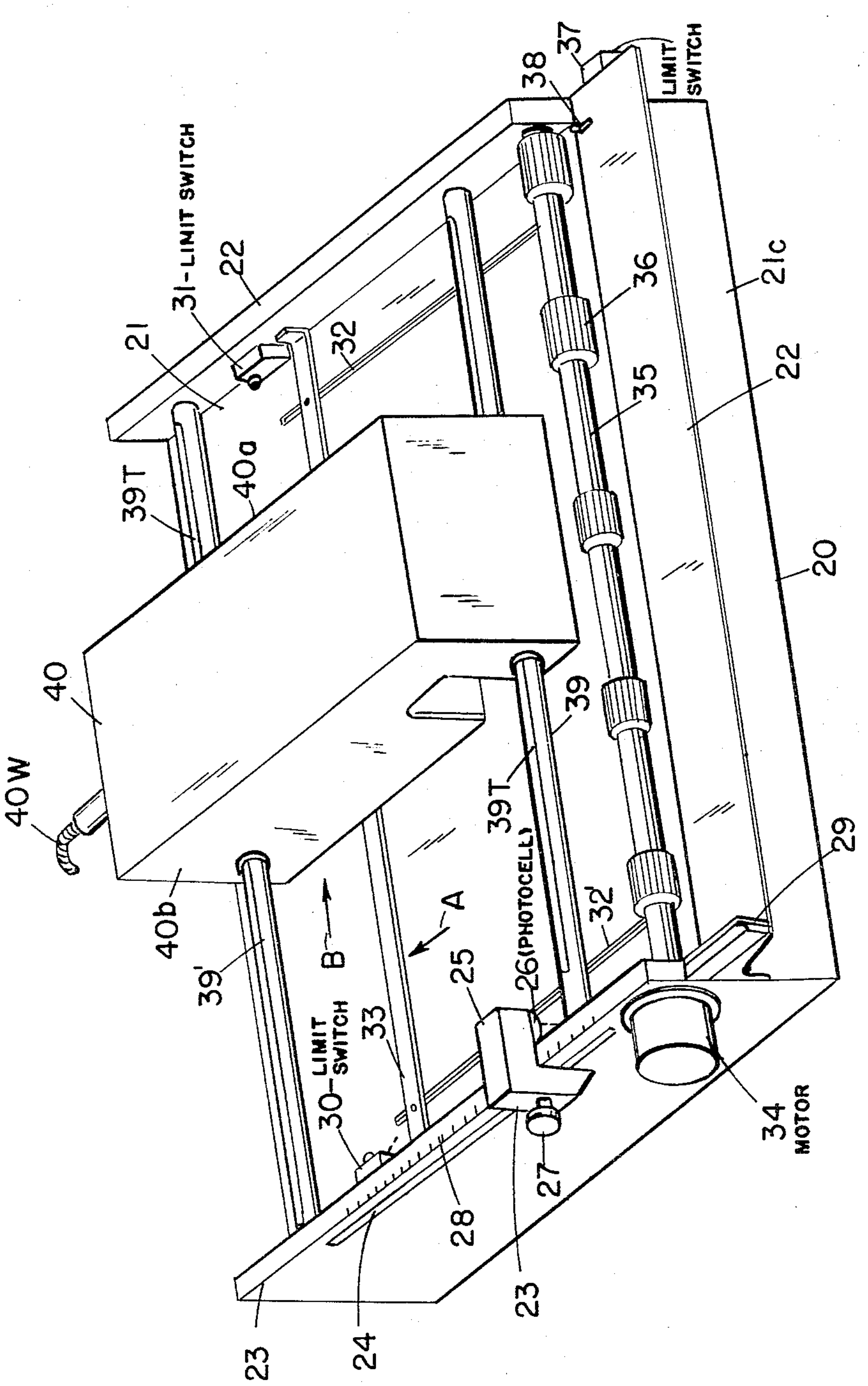
FIGURE 1 is a perspective view of a scanning device designed in accordance with the principles of the instant invention.

The base 21 supports a platform 21' designed to receive the document from a conveyor, chute or other transfer means (not shown). The platform 22 projects from one end of the base and is supported on brackets 29 by the front wall 21*c* of 21. The platform 22 also supports a limit switch 37 having an actuator arm 38 positioned to be deflected by a document fed to the platform and operative to start a servo for driving the document through the device. Notations 22 and 23 refer to parallel projecting portions of the side walls of the base 21 which serve to support various components including two rod elements 39 and 39' which define tracks for a housing 40, a shaft 35 operative to drive documents into reading position and a scanning device 25 to be described. The shaft 35 is supported for rotation by suitable bearings secured by the side walls 22 and 23. A plurality of cylindrical rollers 36 are secured to shaft 35 and are adapted to engage the upper surface of a document, fed thereto, against the upper surface of base 21 and to drive said document along 21 into reading position when gear-motor 34 to which shaft 35 is coupled, operates.

The document scanning device which includes a rotating disc and an electro-optical scanning system, is provided within housing 40 which is self propelled and movable laterally across the base 21 in a path defined by track members 39 and 39', is operative to scan in a fixed path or band area which is parallel to the track members 39 and 39'. Therefore, the position of the document on the surface of 21 or the degree it has been driven in the direction A until stopped for scanning, will determine that portion or line of the document to be scanned. Positioning the document for scanning is effected, in one mode of operation, by the means of a photoelectric cell 26 provided on a mount 25 which is adapted to be adjustably located along the edge of the wall 23 so as to vary the location of the scanning axis of cell 26. The photoelectric detector 26 is operative to scan and detect either the leading edge of the document or a mark or other means indicative of the position of the last entry on the card or line to be read and provides a signal upon sensing said marks, which signal is operative to stop motor 33 and start the motor driving the housing 40 to effect the initiation of scanning the selected lateral row of characters or line of the document. Adjustment of the position of base 25 is effected by means of a locking arrangement including a knurled head screw 27 cooperating with a nut, or shown, which is carried in a slotted hole 24 in wall 23, the combination being operative to lock base 25 in a selected of a plurality of positions along 23 which positions are indicated by marks 28 on the upper surface of 23. The marks 28 are so calibrated as to indicate where to position 25 for effecting the stoppage of motor 33 to preposition the document for scanning respective lateral band areas or selected line entries of the document.

The reader housing 40 is movable along tracks 39 and 39' between limits defined by the side walls 22 and 23 and movement of the housing in one direction is operative to effect the completion of scanning of one line of characters extending across the document. The housing 40 is driven by a motor 41 illustrated in FIG. 2 as being mounted within and supported by the walls of the housing 40 and having a drive shaft 42 supporting a toothed drive wheel 43 which engages teeth 39T formed in a channel 39C provided longitudinally along track member 39. While the operation of gear motor 41 is initiated as a result of the signal generated by the scanner 26, the motor 41 is reversed to return 40 to its starting position when the actuator of a limit switch 31 positioned on wall 22 to engage the side wall 40*a* of 40, is activated. The switch 31 is operatively connected to the necessary reversing control for motor 41 which is located within housing 40 through a flexible cable 40W secured to said housing and sufficiently slack to move therewith. A second limit switch 30 supported by wall 23, is operative to stop motor 41 when the housing returns to the homing position adjacent wall 23. The actuator of 30 is activated when the housing side wall 40*b* moves thereagainst.

Figure 2:
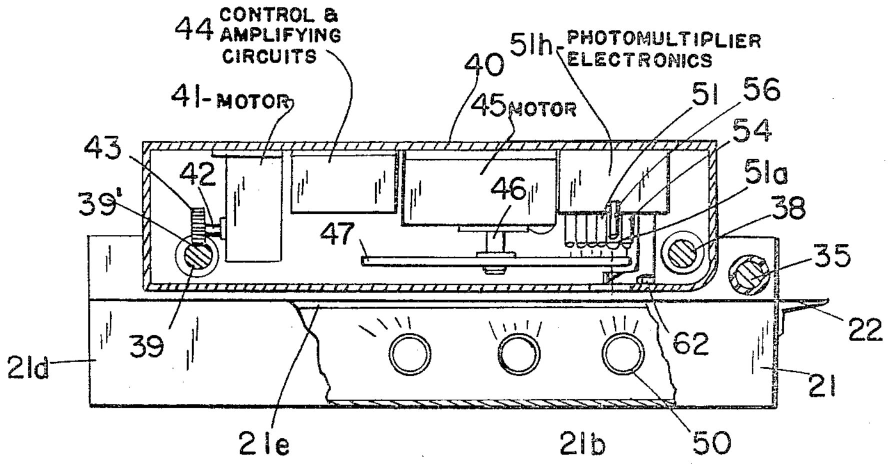
FIGURE 2 is a side view of the scanning device of FIG. 1 with portions of the scanning means housing removed to expose the interior construction.
Figure 3:
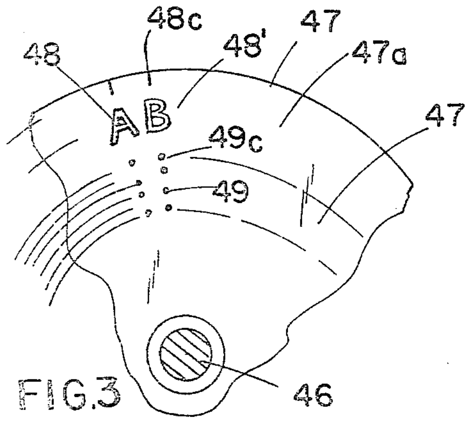
FIGURES 3 and 4 are plan views showing portions of the scanning disc means of FIG. 2 to aid in the description of the instant invention.

Further details of the scanner 20 are illustrated in FIGS. 2 to 5 and include a sub-housing 44 mounted within 40, which contains various control and amplifying circuits to be described, a constant speed motor drive unit 45 for a scanning disc 47 secured to the drive shaft 46 of 45 and a support 50*h* for photo-multiplier cells 51 positioned to scan a portion of the scanning disc 47. Document illuminating lamps 50 are mounted in 21 and/or 40. In a preferred form of the invention, although not necessarily the only scanning means applicable to the apparatus hereinabove described, character scanning is effected by the provision of areas or windows 48 around the disc, which areas are shaped to the contours of the characters being read and are light transmitting while adjacent areas 48' are opaque and mask light directed against the particular annular band area 47A of disc 47 containing the characters 48 so defined. Disposed radially inward of each character 48 is an array of spot areas in the form of respective codes 49 which are scannable by the bank 50 of photomultiplier devices 51 some of which have been omitted from FIGURES 5 and 5*a* for purposes of simplicity. Thus each character 48 is identifiable by a particular code 49 which code, when 48 matches the character being read, is generated to provide a parallel code on a circuit which code is indicative of the character so identified. Also shown in FIG. 2 are a plurality of lamps 50' secured within housing 21 for directly passing light through the document being read to provide images of the characters thereof in the electro-optical scanning system, although reflex lighting means mounted within housing 40 may be employed to illuminate the upper surface of the document.

Figure 4:
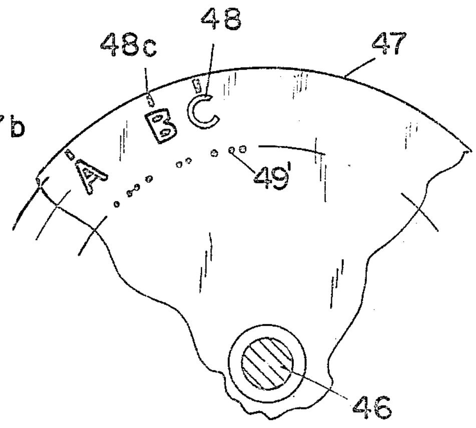

In FIG. 4, a code 49' associated with each disc character 48 is provided along a particular circular path of the disc having as its center, the axis of rotation of said disc. In this embodiment, only one scanning cell need be employed and the code generated is in series rather than the parallel form provided in FIG. 3.

Notation 48C refers to scannable marks or light transmitting lines, there being one such line provided radially aligned with each disc character 48 for locating said character and the code associated therewith to perform the function described hereafter.

Figure 5:
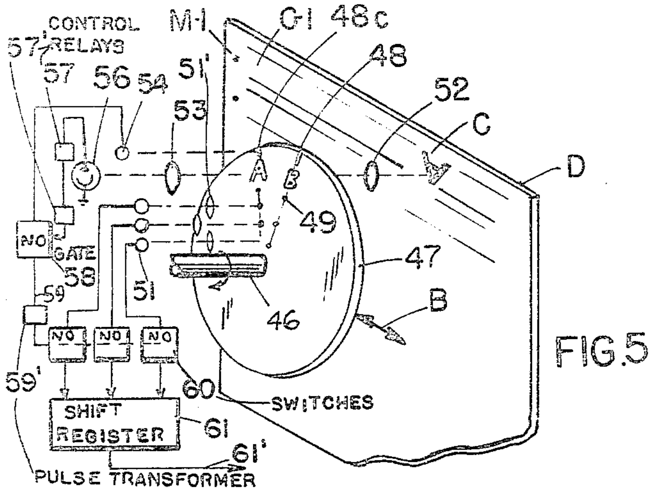
FIGURE 5 is a partial perspective and partial block diagram showing the scanning means of FIGURES 1 through 4 in greater detail.

The basic mode of operation of the electro-optical scanning system is illustrated in FIG. 5 which shows a document D being scanned, disc 47 which rotates at constant speed and preferably in the range of several thousand revolutions per minute or more and a plurality of elements 51 to 56 comprising the electro optical systems and elements 57 to 60 comprising a portion of the signal generating and gating system.

The method of scanning and detecting particular alphanumeric characters of the printed line being scanned, illustrated in FIG. 5, is based on the principal that, if the line to be scanned is substantially aligned with the optical system of the scanner, represented by lenses 52 and 53, the shapes of areas 48 are substantially similar in contour and size as the images of respective scanned characters projected on the surface of band area 47A of the disc 47, the disc 47 is traversed along a path such as indicated by arrow B parallel to the line of characters being read, and said disc is rotated at a high enough speed, then at least once during each complete rotation of the disc a condition will exist where minimum or zero light will pass to a reading photoelectric cell 56 adapted to receive only that light passed through the disc character windows 48. When such a condition of minimum light-passage to the cell 56 exists, a relay or control circuit 57 which is operatively connected to the output of the photoelectric device 56 and is operative to generate a signal on its output when a minimum current or no current appears on its input from 56, and said signal generated thereby is passed to the switching input of a normally open electronic gate 58 having an input from photoelectric scanner 54 which is operative to scan the light transmitting disc-character location marks or apertures 48C. Thus when signals are simultaneously generated on the outputs of 54 and 57, the output 59 of normally open gate 58 is energized by the signal passed to its input from photocell 54 receiving light passed through character marker aperture 48C, which signal is utilized to gate the code signals generated as ready by the bank 51 of photomultiplier devices **51*a*. Each photomultiplier tube or device 51*a* is connected to a respective normally open monostable electronic gate 60′ of a bank 60 of such gate, the switching inputs of each of which are connected to a respective output of a pulse transformer 59′ having line 59 as its input. The multiple outputs of 59′ become simultaneously energized when a pulse appears in line 59 from gate 58 and all of the normally open switches 60′ simultaneously close for a duration to pass the signals generated by those photomultiplier devices 51*a* which are energized in scanning marks or light passed through holes 49 in the opaque disc 47. In other words, the code 49C which is radially aligned with the particular character being scanned by the photomultiplier bank 51, is passed through the temporarily opened switches of bank 60 and is either recorded as a parallel binary bit code by connection of the outputs of said switches to respective recording transducers or is passed to a shift register 61** for converting said code to a series code prior to recording or otherwise utilizing it.

In other words, the code 49C which is radially aligned with the particular character being scanned by the photomultiplier bank 51, is passed through the temporarily opened switches of bank 60 and is either recorded as a parallel binary bit code by connection of the outputs of said switches to respective recording transducers or is passed to a shift register 61 for converting said code to a series code prior to recording or otherwise utilizing it.

Figure 5A:
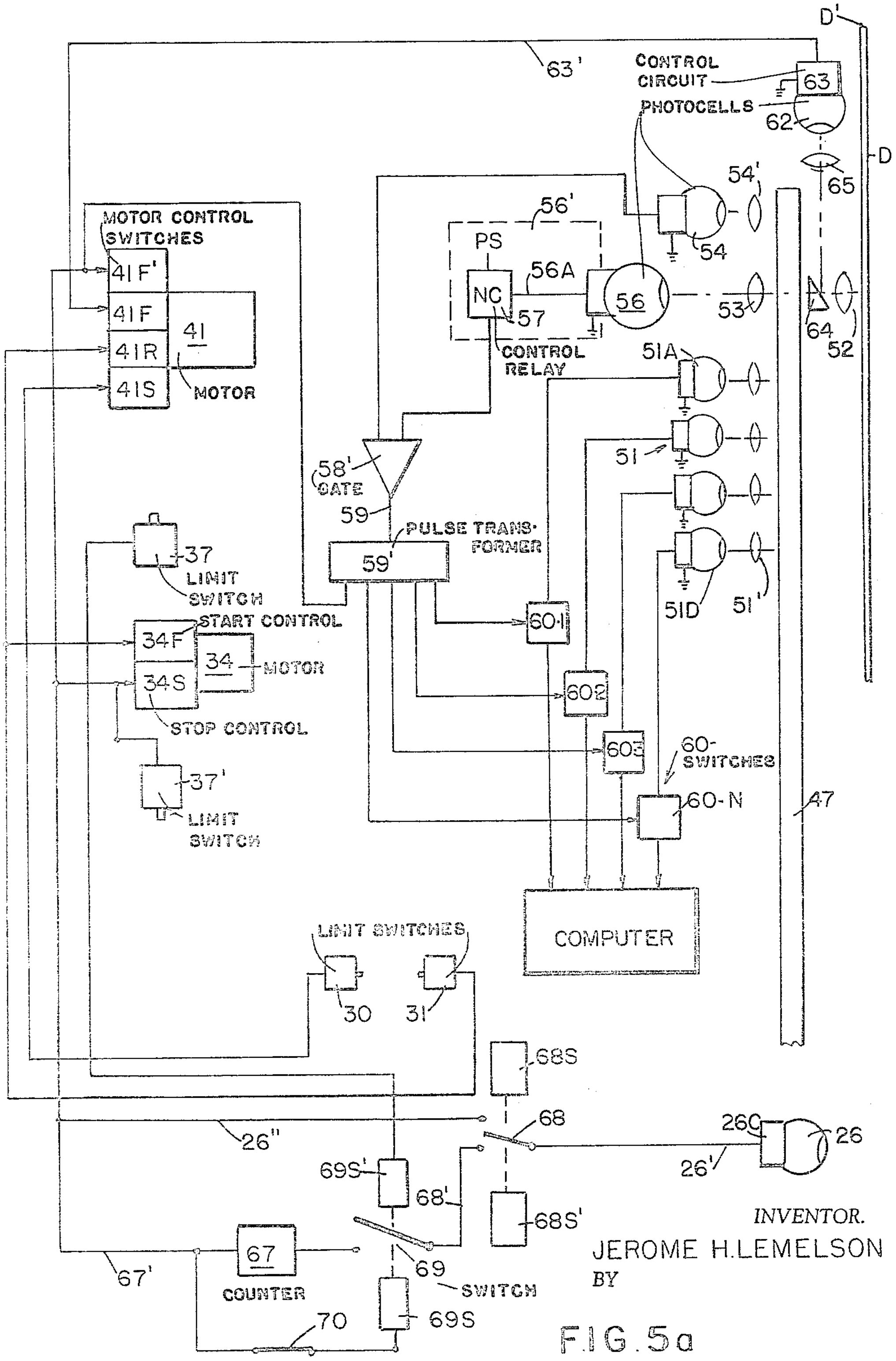
FIG. 5*a* is a schematic diagram showing further aspects of control of the scanner.

FIG. 5*a* illustrates an adjustable automatic control system applicable to the apparatus of FIGS. 1 to 5.

The scanning apparatus of FIG. 5*a* is adjustable to perform one of the following scanning cycles for reading one or more lines of characters provided on a plurality of documents or cards fed consecutively thereto, the selection of which control cycle to employ will depend on the scanning requirements of the particular group of documents fed thereto. Various scanning cycles may be classified as follows—

- (I) Scan just one line of alpha-numeric characters on a document. This may comprise:
  - (A) The only line of characters prepositioned on a card,
  - (B) The last line of characters entered on a document which document may comprsie a bill, for example, with a new accounting entered periodically such as monthly as a row or line of characters so that the monthly entry on each document will appear on the same line as the others,
  - (C) One line of characters appearing at the same line locations on all documents, but not necessarily the last line of characters on the document.
- (II) Scan multiple lines of characters on the document. These may comprise:
  - (A) All lines on a multi-line document,
  - (B) A preselected number of lines including the last line to be entered,
  - (C) Random numbers of consecutive lines of characters including the last line, where different documents may have a random number of entries made as the last number of entries (i.e. No two documents need have the same number of last entries or last consecutive number of lines to be read.),
  - (D) Any random lines of a document which may, though need not all, be consecutive or include the last line of characters entered.

In the control apparatus provided in FIG. 5*a*, for the purpose of simplifying the diagram, it is assumed that power supplies for the various components such as switching devices, relays counters, solenoids, motors, controls and the like are provided correctly in circuit therewith where not illustrated.

Describing now the control means of the apparatus of FIG. 5*a* which is applied to effect the various modes of scanning briefly mentioned above:

(*I–A*).—Scanning the only line of characters entered on a document such as a card, is effected by feeding the document to platform 22 which trips arm 38 of limit switch 37 which pulses the start control 34F of motor 34 rotating shaft 35 to drive the card through the reader. Card edge scanner photocell 26 detects a notch or mark M printed along the left edge of the card aligned or prepositioned with respect to the line of characters to be read. The control 26C for the photocell 26 is adapted by conventional means to generate a pulse either when detecting the leading edge of the card or when a character line indicating mark M is aligned with the optical system of the photocell, which pulse is passed to the stop control 34S for motor 34 which stops the feed of the document or card to position it with said single line of characters aligned with the optical system of the character reading multiplier type photocell 56. Which of the two phenomenon is used to activate the cell will depend on adjustments in the cell controls. For example, if the cell control 26C is operative to generate a control pulse upon detecting the leading edge of the card, a light source mounted beneath the card is employed and masking said light by means of the card is operative to activate 26C to generate a pulse or signal by conventional means. Conventional electronic means in controller 26C may also be used to generate a pulse on output 26′ when a black mark along the left border of the card is aligned with the optical system for the cell 26.

With switch 63 connecting circuits 26′ and 26″, the pulse output of 26C is passed to the start control 41F′ of motor 41 causing housing 40 to be driven at a first speed from home position adjacent wall 23 in the direction of arrow B. The motor 41 may be operated at one speed during scanning or at two speeds including a first fast speed while the optical system of scanner 56 approaches the first character of the line to be scanned and/or during traversing the distance between characters and a second slower speed than the first while each character is moving through the optical field of the scanner 56. Such dual speed movement of the scanner will reduce the total time required for scanning each line and will permit slower scanning of each character without requiring a substantially long period to scan across the entire width of the document.

Dual speed control is effected by means of another photoelectric cell 62 which is fixedly mounted within housing 40 and adapted to receive a portion of the image passed through the optical system for character scanning cell 56 before said light passes thru disc 47. A half-silvered prism 64 placed behind lens 52 is operative to pass light of images of the characters being scanned to both cells 56 and 62. The optical system for cell 62 is represented by lens 65 and is preferably adapted to present a thin line image area of the surface of the document, the length of which image area is approximately the height of largest character of the line being scanned and which line is preferably a portion of the leading edge or leading portion of the image field of the scanner 56. When cell 62 receives total reflected light (i.e. when there is no image of a character in its thin band field), cell control circuit 63 will not generate an output signal. However, as soon as the intensity of light passing to cell 62 drops below a predetermined level as caused by a portion of the image of a character entering said thin band scanning field of 62, control 63 is operative to generate a signal on its output 63' which is passed to the control 41F for motor 41 which is activated thereby to switch to slow operation and to drive scanner assembly 40 at a slow traversing rate which continues either until the image of the character being scanned has moved out of the image field of 62 so that no signal is generated on line 63' and control 41F' will be reverted to (assuming control 41F is a monostable switch which by-passes 41F') or, in a more preferable mode of control, the output signal generated on line 59 when the character has been identified by scanner 56 is passed to motor control 41F' to revert to fast traverse.

The character scanning and identifying means of FIG. 5*a* is quite similar to that illustrated in FIG. 5. The output of character scanner cell or cells 56 is passed to a photoelectric control 56' which generates a signal on its output when zero or substantially little light is passed to the cell (i.e. when the cell scans the mask opaque areas or a character window 48 is substantially if not completely blocked of light by the image of a similarly shaped character focussed thereon). The controller 56' is shown in greater detail in FIG. 5*a* and includes a normally closed monostable electronic gate 57' having an input from a power supply PS and an output extending to one input of an AND circuit 58'. The output **56*a* of the cell 56 is energized with a signal when cell 56 receives light through windows 48 in disc 47 reflected from the document and said signal is used to open switch 57' so that no current passes to 58' from PS. However, when a character window 48 matches the character being scanned, output 56*a* is de-energized permitting switch 57' to close and passing current from PS to 58'. When this occurs as the window character alignment mark or window line 48C is scanned by cell 54, an output is generated by the latter which is passed to AND circuit 58' generating a signal on its output 59 which is passed to a pulse transformer 59' having plural outputs extending to monostable normally open switches 60 which are connected in the outputs of the code scanning photomultiplier devices 51. The switches 60–1 to 60–N, thus closed, pass those signals generated when respective of the cells 51 scan respective marks or light transmitting code portions of disc 47 radially aligned with the window of the identified character. As stated, an output of transformer 59' is also connected to fast traverse control 41F' for motor 41**.

Upon completion of scanning the single line of characters, limit switch 31 is activated when the wall of 40 is driven gainst the actuator of the switch, whereby 31 generates a pulse signal which is passed to start control 34F of motor 34 driving the document completely out of the reader. The switch 31 may be slow-to-close and control 34F monostable such that motor 34 operates a sufficient interval to remove the document from the scanning apparatus. However, a more preferred control means comprises use of a scanner 37' such as a limit switch or photoelectric relay operative to detect when the trailing edge of the document has passed out of the scanner to activate the stop control 34S of motor 34. This will permit manual adjustments to the control apparatus to effect the other modes of control as described.

(1*B*).—Scanning just the last line of characters on each document fed to the reader is effected as follows. A manually presettable, self-resetting counter 67 is connectable to the output 26' of the photoelectric control 26C by closing manual switches 68 and 69. The counter 67 receives pulses generated when cell 26 scans character line position indicating marks M along the longitudinal border of the document and may be preset to generate a control pulse on its output 67' upon receipt of a predetermined number of line indicating pulses. The output 67' extends to stop control 34S of motor 34 and start control 41F' of motor 41. The preset count at which 67 generates a pulse may be made such that the line scanned is the last line of all documents containing characters. The counter 67 may also be replaced by a presettable, self-recycling timer-relay adapted to generate a control signal which is passed to 34S and 41F' at a time after receiving a pulse generated when 26 detects the leading edge D' of the document such that the card comes to rest with a predetermined lateral band area or line of character aligned with the scanning field of scanner 56.

If marks M are provided adjacent locations all along the length of the document, the input from 26C to 67 may be deactivated until the next document is fed to the scanner by passing the control signal output of 67 to activate a solenoid 69S which opens a switch 69 between 67 and 26C so that 67 will remain de-energized until the next document enters the scanner whereupon the output of switch 37 energizes a second solenoid 69S' closing switch 69. Switch 70 between 67 and 69S may be manually opened permitting operation 67 to receive all pulses generated by 26C.

Further variations in the apparatus of FIGS. 1–5*a* are noted. Using substantially the same means illustrated for positioning and driving a document and for traversing a scanning character identifying means, the rotating disc 47 may be replaced by other movable character window containing means such as (a) a closed loop, flexible film strip or metal belt containing cut-outs the shape of the characters to be read and driven in a closed loop path around a plurality of pulleys supported by a frame which also supports the scanning cells, (b) a drum having peripheral character windows arranged in a closed loop on its cylindrical surface, (c) a plate having a row of character windows having the shape of the characters to be read and movable with said row of windows moved parallel to and in alignment with the line of characters to be read. In the latter arrangement, the characters scanning photocell moves parallel to the row of windows as the plate is oscillated many times back and forth across the line to be read.

In another modification, the character shaped windows or light transmtitting areas 48 may be replaced by character identifying means in the form of a plurality of group of plural small holes or light transmitting windows, with the holes of each group adapted to indicate the identification of a character when the image thereof falling onto the disc or base containing the holes is operative to provide no reflected light passing through any of the holes in the group. Such a condition may be photoelectrically detected during an interval when, for example, a scanner such as mark scanner 54 scan a character position indicating mark 48C to generate an output signal as described and utilizable to read code marks as described.

As stated, if it is desired to scan the first line of characters on a document or the only line provided thereon, bi-stable manual switch 68 is thrown to connect circuits 26' and 26''. Notations 68S and 68S' refer to solenoids which are each remotely operative for respectively throwing bi-stable switch 68 to either its condition where the output of cell 26 is passed directly to controls 34S and 41F' or to counter 67. To scan any predetermined lateral band area of the document or line of characters, switch 68 is thrown to its other condition connecting circuits 26' and 68' and switch 69 is closed. The counter relay or timer 67 is then preset to generate a control signal on its output 67' upon receipt of any predetermined number of pulses from marker scanner 26 or at a predetermined time interval after 26 scans the leading edge of the document. If device 67 is a counter and is preset to generate a control pulse on its output upon receipt of each pulse on its input (i.e. set for one count), then each line of the document will be read in a stepping fashion. If marks M are printed in alignment with each row of characters and terminate with the last row of characters, then after reading the last row, the document will be driven out of the reader upon energization of limit switch 31 since no further signal will be generated on line 67' to stop motor 34 after 26 has scanned the last line indicating mark.

By replacing or bypassing counter 67 with a programming device such as a multi-circuit timer or a programmable counter, it will be possible to scan any selected number of character rows on a document. Such a programmable counter may comprise a stepping motor coupled to a shaft having a plurality of cams or pins set at different angles to each other. The shaft is step-rotated equal angles each time a pulse is generated by line mark scanner 26. The preset cams are operative to close and open respective switches all connected to generate pulses on line 67' when different lines of characters are aligned with scanner 56.

To read the last line of a plurality of lines, the number of which may vary from document to document, scanner 26 may be positioned to scan mark locations one or more lines ahead of scanner 56. Upon detecting a condition where no mark is present (i.e. where the lines of characters terminate) the scanner control 26c may be operative to generate a signal on its output 26' which is connected to circuit 26'' and effects scanning said last line of characters.

It is thus seen that by adjusting and actuating the various switch and control means of FIG. 5a, various modes of scanning operations, as described, are possible to account for varying scanning functions according to the requirements for reading. If the documents are designed whereby the character line locating marks M may be provided at different distances from the left border or edge of the documents, such as in different columns provided adjacent said border, and the position of the scanning axis of the mark scanning cell 26 may be laterally adjusted along mount or arm 25 so as to locate said cell to scan the particular column or longitudinal strip area of each document, then a further mode of control is derived in which one or more random lines of characters of each document may be automatically scanned as determined by those character line marks appearing in the column being scanned. In other words, if documents are used which do not necessarily contain the same number of lines of characters and without any particular requirement for scanning all documents, then any selected line or lines of each document may be automatically read as described by providing marks adjacent those lines to be read and in the particular lateral band area or column being scanned by cell 26, which controls positioning of the character scanner. For such a scanning function, switch 68 would be thrown to connect circuits 26' and 26''. Such a mark or marks may be provided when one or more character line entries are made by typing or by means of manual means such as a pencil or pen. As an example, for a document requiring one or more monthly entries which must be read, twelve such scanner-mark columns may be provided and the machine will operate to read any number of entries made during the month by providing marks M adjacent said entries all in the proper column to be scanned by 26, which cell is laterally positioned and set by manual means at such a calibrated location along the arm 27 of mount 23 as to scan the selected column of marks M which indicate those lines of characters to be read. Marks appearing in all other columns, such as provided during previous entries, will therefore not affect reading functions associated with the last entry or entries.

It is noted that the scanning components of the apparatus of FIGS. 1–5 may be subject to degrees of variation. For example, scanning of the selected line of characters may be effected by disc aperture means dividing each character into segments which are analyzed and automatically recognized by computational means as shown in U.S. Patents 2,663,758, 2,897,481 and 2,978,590.

Also, the servo motor 33 utilized for driving the document may be controlled by an input means interlocked to the operation of limit switch 31 to step the document one line distance at a time for scanning selected lines.

Other variations in the apparatus of FIGS. 1 to 5a include the following:

The housing 40 containing the scanning and comparator apparatus may be movable in a plurality of directions in addition to back and forth along tracks 39 and 39'. For example, tracks 39 and 39' may be mounted on a carriage movable back and forth in the direction of arrow A or longitudinally with respect to the document positioning means or base 20. Such movement and the automatic control thereof as described may be used to read columns of characters such as numeric characters entered in a ledger without the need for controlling motor 34 to effect said action although motor 34 may be so controlled to read columns of characters by either providing limit switches 30 and 31 positionably adjustable at different lateral locations along the upper surface of base 20 so as to limit the movement of housing 40 to permit scanning one or more selected columns of characters in a series of sweeps across the character or characters appearing in each line of the column between stepping movements from line to line controlled as described hereinabove. If opaque lines or marks define the lateral limits of each column then photoelectric cell scanning means such as cell 26 positioned, however, to scan and define the left and right limits of travel of the housing 40 for scanning one or more columns of a document by generating control signals when said cell scans said opaque lines or column defining marks and utilizing said control signals to perform the functions of the signals generated by limit switches 30 and 31. Such an auxiliary scanning cell used to replace limit switches 30 and 31 is preferably mounted within housing 20 and adapted to receive light from the spacing above or below the line of characters to be scanned so that the images of the characters will not activate the photoelectric relay. Also, the output of the photocell relay is preferably connected to an adjustable counter such as 67 to permit variable adjustment of the number of columns of characters read during a single lateral sweep of the housing 40.

In still another embodiment, the character shaped windows 48 may be replaced by photoconductive material provided in either substantially the same contour of the characters being scanned or masked to present said contours to receive light imaged thereon by suitable optical means scanning each character as the scanner housing moves rightwardly. When minimum or no light falls on the photoconductive character shaped cells provided on the disc, the electrical emission therefrom is minimized or drops to zero and by connecting each photoconductive character in circuit with a respective code generating means or means for generating character codes as described and using the reduction in electrical output thereof effective when the image of a character and photoconductive element match to gate or generate the code as described, the function of reading and identifying characters is accomplished.

Means other than that illustrated in FIG. 1 may be employed for prepositioning documents relative to the scanner housing 40. For example, cards or documents may be fed onto a drum and retained thereagainst by air pressure. The drum may be stepped in rotation or continuously rotated while the scanner is properly conveyed relative thereto for scanning characters line by line or a selected line of characters. Gravity may also be employed to feed cards containing one or more lines to be read, into alignment with the housing 40 prior to scanning while one or more adjustable stops effect alignment of the card whereby the line of characters to be read are prepositioned relative the scanner. Retraction of the stops to permit removal of the card by gravity, by means of a solenoid actuated by the signal generated when limit switch 31 becomes activated, may be provided to control card movement and the feeding of a new card to be read thereto.

While I have shown and described preferred and alternate forms of my invention, it will be apparent to those skilled in the art that many changes may be made therein without departing from the broad principles herein disclosed. Consequently, I do not wish to be restricted to the particular form or arrangement of parts or sequence of operations herein shown and described, except as limited by my claims.

I claim:

1. Apparatus for reading characters provided on a document comprising:

(a) first means for scanning characters,
(b) second means for receiving and prepositioning a document to be scanned relative to said first means,
(c) said first means including third means containing all of the characters to be identified,
(d) comparison means coupled to said third means,
(e) fourth means movably mounting said first means,
(f) means moving said first means on said fourth means to rotatably convey said identifying means through the field of said scanning means,
(g) means relatively moving said third and second means whereby said first means traverses a path parallel to a line of characters to be read and in a manner to scan each character with said identifying means,
(h) said third means further comprising fifth means for generating different code signals each representative of a different character,
(i) computing means for receiving code signals, and
(j) control means operatively connected to said code signal generating means and said comparison means and operative to effect transmission of a code representative of an identified character to said computing means only when the same character of said third means is in alignment with the character being read on said document.

2. Apparatus in accordance with claim 1, said first means comprising photoelectric scanning means, said third means comprising masking means disposed between said photoelectric scanning means and having an opaque portion interposed between a plurality of light transmitting portions including at least one light transmitting portion defining the contour of each character being scanned.

3. Apparatus for reading characters in a document in accordance with claim 1; said document comprising a card, said first means including means for illuminating the card surface; said third means comprising a revolving disc having a plurality of apertures arranged around said disc; said apertures being formed to resemble alphanumeric characters; said fifth means comprising a plurality of groups of small openings arranged around said disc; each of said groups being arranged in radial fashion and being associated with a respective alphanumeric character; first light sensing means; comparison means comprising first lens means for focusing light reflected from said card upon said disc and said light sensing means; second light sensing means; second lens means for focusing light passing through said aperture groups upon said second light sensing means; said computing means comprising readout means being responsive to said second light sensitive means when said first light sensitive means receives light of a minimum degree of intensity; plural means on said disc for marking the center of each character on said disc; third light sensing means for controlling operation of said second light sensing means only when indicating the centering of a character.

4. Apparatus in accordance with claim 3, plus means for revolving said disc at an angular velocity sufficient to complete a full revolution before said first means is moved to the next character.

5. Apparatus in accordance with claim 4, plus means for energizing said light sensing means only when said card character is in alignment with each character aperture of said disc.

6. Apparatus for reading a document containing at least one line of characters to be read comprising:

(a) a document supporting means,
(b) means for prepositioning the document on said supporting means,
(c) photoelectric character scanning means,
(d) a mount for said scanning means,
(e) means for moving said scanning means along a linear path across said document and along a line of characters,
(f) a mask in the form of a disc rotationally supported on said scanning means mount, and disposed between the document on said document supporting means and said scanning means,
(g) means rotating said disc,
(h) a plurality of light transmitting windows disposed around said disc for scanning characters as said disc rotates,
(i) optical means for imaging said characters at said windows to reduce light reflected off said document as a character image sweeps past each window,
(j) said character scanning means positioned to receive light passed through said windows,
(k) control means associated with said scanning means and operative to generate an output signal when minimum light passes through said mask to said photoelectric means during the time a character image is substantially aligned with a window, and,
(l) code signal generating means operative to receive said output signal and employ same to generate a code on its output indicative of the character being scanned.

7. Apparatus for reading comprising:

(a) first means for receiving a document having a line of characters to be read,
(b) means for prepositioning said document relative to said first means,
(c) second means for optically scanning characters,
(d) third means disposed between said second means and a document prepositioned on said first means for masking characters,
(e) said third means having a plurality of character windows disposed along a track including at least one window substantially the shape of at least a portion of each character to be scanned,
(f) optical means for imaging characters being scanned on said third means substantially to the scale of said windows,
(g) means for relatively moving said third means and said second means to successively present an image of each character to be read at the windows of said third means,
(h) means generating a first signal each time a portion of said third means containing a window defining a particular character is aligned with said optical scanning means,
(i) means including said optical scanning means for generating a second signal when a window defining a particular character is substantially aligned with the image of the same character,
(j) electrical means for receiving said first and second signals and operative to generate a gating signal on its output upon simultaneous reception of both signals,
(k) character indicating signal generating means operative to generate a different character identifying signal during the interval each character window is substantially aligned with said optical scanning means,
(l) computing means for receiving signals indicative of characters identified, and
(m) normally open gating means disposed between said character signal generating means and said computing means, (n) said gating means connected to said electrical means and operative to close when said gating signal is present thereat for an interval to pass the correct character indicating signal to said computing means.

8. Apparatus for reading comprising:

(a) first means for positioning a document with a line of characters to be read, (b) second means for optically scanning characters and producing a signal when a character is identified, (c) third means disposed between said second means and a document positioned by said first means for masking characters, (d) said third means having a plurality of character windows defining substantially the shape of different characters to be read, (e) means for linearly moving said third means and said second means across said document to successively present the characters to be read imaged on said third means at said windows, (f) scannable locating means disposed on said third means for indicating the location of windows defining respective characters, (g) fourth means for scanning said locating means and operative to generate a signal each time a locating means is scanned, (h) fifth means connected to said second means and said fourth means and adapted to generate a control signal on its output upon simultaneously receiving signals from both said means, (i) character indicating signal generating means, (j) gating means for receiving signals from said character signal generating means, (k) said fifth means being connected to operate said gating means to pass signals indicative of identification of a character being scanned when the image of said character is aligned with a particular character window in the scanning field of said scanning means.

9. Apparatus in accordance with claim 8: said means for relatively moving said third and second means being operable at two speeds including a fast speed operative when said second means is not scanning a character and a relatively slower speed, control means for said moving means operative to effect switching from said fast to said slower speed and to revert therefrom to said fast speed scanning said characters, said second means being operative to generate a control signal when a portion of a character enters the scanning field of said second means, said second means being operatively connected to said speed control means to cause said moving means to shift in operation from said fast to said slower speed, and means operative upon identification of the character scanned for operating said control means and causing said moving means to operate at said fast speed until the next character to be scanned enters the field of said second means.

10. An optical reading arrangement comprising an optical reading disc, said disc having an alpha-numeric character mask band and including light transmitting windows shaped as the characters being read and extending annularly about the center of said disc, and separated by opaque areas, said band having a light blocking portion with light transmitting windows disposed in a circumferential array which light transmitting portions define alpha-numeric characters to be read, means for rotating said disc about its radial axis, means generating a plurality of bit codes with the rotation of said disc with a different code generated simultaneously with each alpha-numeric window provided in said disc, means for prepositioning a member having a line of characters to be read in said apparatus and for effecting relative movement of said disc and said member in a path in which the distance from the axis of rotation of said disc remains substantially constant, optical scanning means positioned adjacent said disc and said member being read, said optical scanning means being operative to present an image focused on the character band of said disc with the image of each character so focused being substantially equal in size and shape to at least one of the transparent areas provided on said disc band whereby when a character defined by the similarly shaped window of the disc is in substantial alignment with the image of a similar character derived from scanning the surface of the member being read, substantially minimal light will pass through the band areas, light sensing means disposed for receiving light from said optical system, relay means operatively connected to said sensing means and energizable when a predetermined minimum amount of light is received thereby, reading means for said disc codes, an output for said apparatus for transmitting code signals as generated by said code sensing means, and gating means for providing on said output only those codes sensed when said light passing through said disc is at said minimum, said gating means being operative in response to said relay means; plural marking means for marking the center of each character; light sensing means sensing said marking means for enabling said gating means to provide an output only when a character on said disc is centered over the character being read on said document.

11. An optical reading arrangement comprising an optical reading disc, said disc having an alpha-numeric character mask band extending annularly about the center of said disc, said band having a light blocking portion with light transmitting portions disposed in a circumferential array which light transmitting portions define alpha-numeric characters to be read, means for rotating said disc about its radial axis, a plurality of bit codes provided on said disc with at least one code prepositioned relative to a respective alpha-numeric transparent area on said disc, a member to be read by said apparatus and having at least one line of printed alpha-numeric characters, means for prepositioning said member in said apparatus and for effecting relative movement of said disc and said member in a path in which the distance from the axis of rotation of said disc remain constant, optical scanning means positioned adjacent said disc and said member being read adapted for presenting an image focused on the disc of the characters being read with the image of each character presented on the disc being approximately equal in size and shape to at least one of the transparent areas provided on the band of said disc whereby when a character defined by the transparent area of the band of the disc is in substantial alignment with the image of a similar character derived from scanning the surface of the member being read, substantially minimal light will pass through the band area, light sensing means disposed for receiving light from said optical system, relay means operatively connected to said sensing means and energizable when a predetermined minimum amount of light is received thereby, reading means for said disc codes, an output for said apparatus for transmitting code signals as generated by said code sensing means, and gating means for providing on said output only those codes sensed when said light passing through said disc is at said minimum, said gating means being operative in response to said relay means; plural marking means for marking the center of each character; light sensing means sensing said marking means for enabling said gating means to provide an output only when a character on said disc is centered over the character being read on said document.

12. Apparatus in accordance with claim 11 wherein said sensing means responsive to said position indicating means is adapted to provide a pulse signal on the output of said sensing means upon sensing said position indicating means, further control means for controlling the gating of said code signals, said further control means being responsive to respective signals from both said first relay means and said position indicating sensing means to effect the gating of a code signal on the output of said apparatus only when both signals are present thereat whereby only one code signal may be generated for each alpha-numeric character sensed by said sensing means.

13. Apparatus in accordance with claim 11 including a receiving and prepositioning means for said recording member further including means for holding said recording member stationary in a predetermined position relative to said disc such that a line of alpha-numeric characters on said recording member is presented substantially at right angles to the rotational axis of said disc, said means for moving further including means for moving said disc as it rotates in a path which is parallel to the alpha-numeric characters recorded on said member whereby said alpha-numeric characters will always be scanned by the characters defined by the transparent areas on said band of said disc.

14. Apparatus in accordance with claim 13 including means for adjusting said prepositioning means for said member containing said alpha-numeric characters whereby a predetermined band area of said member may be so scanned.

15. Apparatus in accordance with claim 14 wherein said prepositioning means includes servo means further operative to effect the degree of operation of said prepositioning means, controls for said servo, and means for energizing said servo control to effect the operation of said prepositioning means.

16. Apparatus in accordance with claim 15, said member having said alpha-numeric characters provided thereon comprising a sheet of printed matter having a plurality of lines of alpha-numeric characters, line indicating means provided on said sheet, sensing means for reading said line indicating means, said line indicating sensing means adapted to generate a signal upon reading a predetermined line indicating means, a third relay means responsive to said signal, said third relay means being operatively connected to control said servo and to stop said member in a predetermined position upon becoming energized whereby said rotating disc will scan a predetermined band area of said member containing a row of alpha-numeric characters.

17. Apparatus for reading printing characters on a base member comprising in combination with a mask member, means for rapidly rotating said mask member about a predetermined axis, a circular array of light transmitting portions of said mask member each of different contour and of a similar contour to characters being read thereby, said circular array of light transmitting portions being radial of the axis of rotation of said member, a circular array of code indicia provided radially adjacent said light transmitting character portions of said mask member and having at least one code indicia prepositioned relative to a light transmitting character thereof, transducing means for reading said code indicia, means for prepositioning a member to be read relative to said apparatus and for relatively moving said rotating masking member and said document in a path whereby said circular array of light transmitting characters will individually align with and sweep past a predetermined line of characters of said document, optical means for imaging the characters of said document in alignment with the area of said circular array of light transmitting character areas in a manner whereby at least one transparent area of said band will come upon alignment with a predetermined character, have substantially little or no light reflected from the surface of said document passing therethrough, a light detection means disposed for receiving reflected light from the document after passing through said light transmitting areas of said masking means, and adapted to generate and output signal when receiving no light therefrom, further signal generating means adapted for generating a pulse signal each time a transparent character area is aligned with said light detection means, a logical AND control circuit having inputs to said further signal generating means and said light detection means and adapted for generating a pulse signal output when minimum light is received by said light detection means and when said further signal generating means is energized for indicating and identifying a character being read, transducing means for reading said code signal recordings, a computing means for receiving the output of said transducing means, a normally open, monostable switching means disposed between said transducing means and said computing means, said normally open switching means having a switching input which is connected to the output of said AND circuit whereby the output of said transducing means is gated to said computing means only upon energizing of the two inputs to said AND circuit and is an indication of the character being read.

References Cited by the Examiner

UNITED STATES PATENTS

| | | | |
|---|---|---|---|
| 2,228,782 | 1/1941 | Sharples | 340—146.3 |
| 2,714,843 | 8/1955 | Hooven | 340—146.3 |
| 2,784,397 | 3/1957 | Branson et al. | 340—146.3 |
| 2,877,081 | 3/1959 | Dodge | 235—61.11 |
| 2,919,425 | 12/1959 | Ress | 340—146.3 |
| 2,985,366 | 5/1961 | Scarrott | 340—146.3 |
| 3,170,139 | 2/1965 | Rabinow | 340—146.3 |
| 3,206,725 | 9/1965 | Fitzmaurice | 340—146.3 |

OTHER REFERENCES

Pages 91–92, Oct. 1959, IBM Technical Disc. Bull., vol. 2, No. 3.

MAYNARD R. WILBUR, *Primary Examiner.*

MALCOLM A. MORRISON, *Examiner.*

J. E. SMITH, I. S. IANDIORIO, *Assistant Examiners.*